(No Model.)
D. BROOKS, Jr.
BOX FOR THE DISTRIBUTION OF ELECTRIC WIRES.
No. 401,927. Patented Apr. 23, 1889.
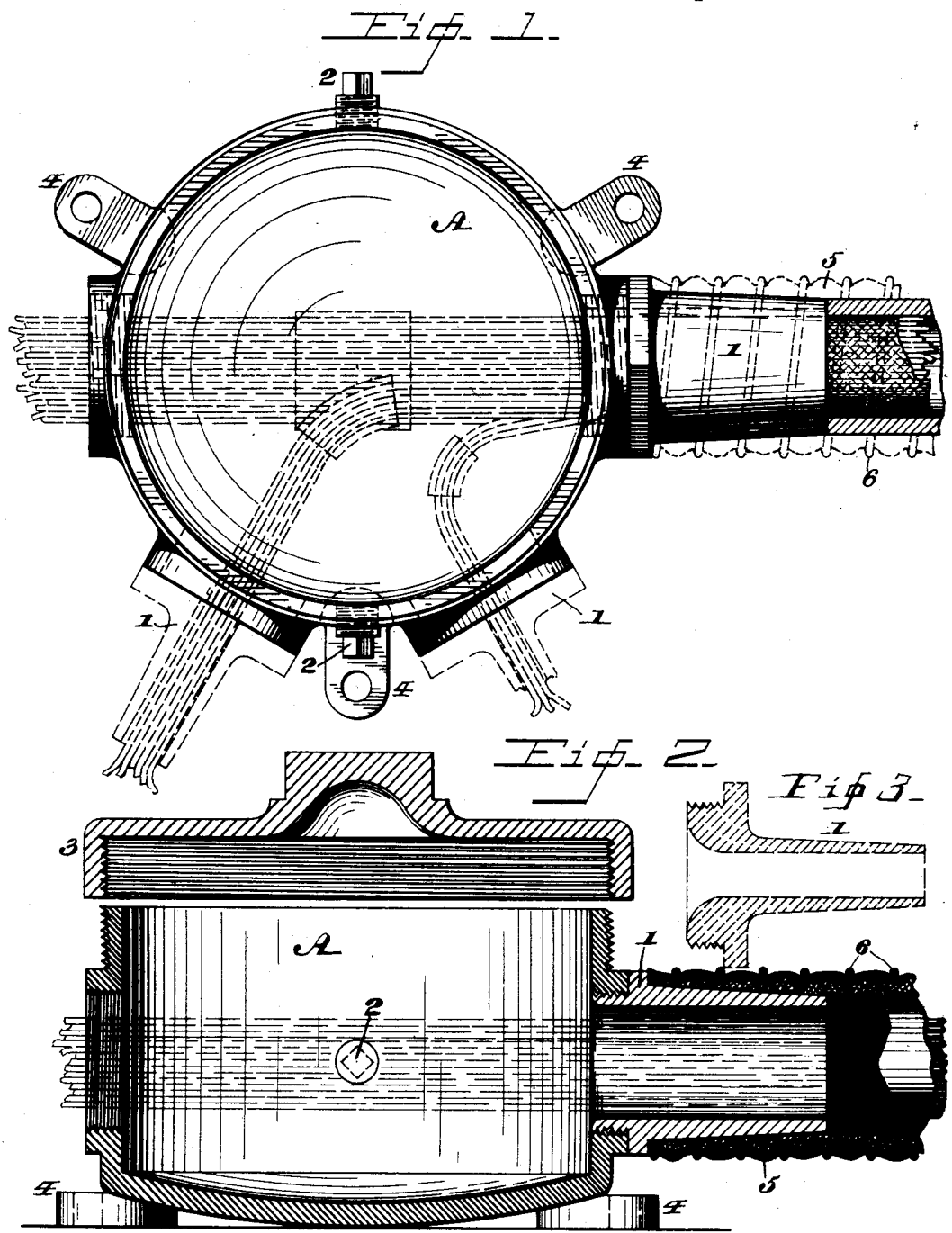

United States Patent Office.

DAVID BROOKS, JR., OF PHILADELPHIA, PENNSYLVANIA, ASSIGNOR TO THE ELECTRIC CABLE CONSTRUCTION AND MAINTENANCE COMPANY, OF SAME PLACE.

BOX FOR THE DISTRIBUTION OF ELECTRIC WIRES.

SPECIFICATION forming part of Letters Patent No. 401,927, dated April 23, 1889.

Application filed November 26, 1888. Serial No. 291,938. (No model.)

*To all whom it may concern:*

Be it known that I, DAVID BROOKS, Jr., a citizen of the United States, residing in the city and county of Philadelphia, State of Pennsylvania, have invented a new and useful Improvement in Boxes for the Distribution of Electric Wires, which improvement is fully set forth in the following specification and accompanying drawings.

My invention consists of a box for the distribution of electric wires, more particularly for underground purposes, on man-holes, branch stations, &c., the construction, operation, and advantages being hereinafter fully set forth.

Figure 1 represents a top or plan view of a box embodying my invention, (the cap thereof being removed.) Fig. 2 represents a central vertical section thereof. Fig. 3 represents a sectional view, in dotted lines, of a nozzle adapted to enter the opening in the box, but of a different diameter of bore from that shown in Fig. 2.

Similar letters and numerals of reference denote corresponding parts in the two drawings.

Referring to the drawings, A represents a box of cylindrical form, made of metal, the same being provided at its sides with branches or nipples 1 and screw-plugs 2, and at top with a closing screw-cap, 3. At the back or bottom of the box are ears 4, whereby the box may be secured in position within a manhole, branch station, &c.

The nipples or branches and the openings to which the screw-plugs are fitted form communications between the exterior and interior of the box.

The operation is as follows: The cap 3 is removed and the cable introduced into the interior of the box through the proper nipple or branch, which in the present case is the one on the right-hand side of the figures in the drawings. The portion of the cable that enters the nipple is stripped of its lead or other incasement and the edge of the existing incasement abutted against the outer edge of the nipple. The joint between the incasement and nipple is then covered by a wrapping, 5, of suitable fabric, rubber tubing, or other suitable material, and said wrapping is bound by a wire, cord, or strap, 6, coiled or wound around said wrapping, whereby a tight joint is produced and leaking thereof prevented. The wires of the cable are distributed through other nipples or branches, as shown in the dotted lines, Fig. 1, it being noticed that the diameters of the nipples or branches vary, those employed being of the diameter relatively to the number of wires that it is desired to pass through the same, as will be seen in Fig. 1, and the dotted Fig. 3 on the right of Fig. 2. The openings in the box to receive the nipples are of uniform diameter, so that, as the nipples are interchangeable, any nipple will fit either of said openings. The different lengths of wires as distributed are suitably spliced to the wires of the main cable, after which the cap or lid is secured tightly into position. One of the plugs 2 is unscrewed, and through the opening thus uncovered insulating liquid or material, preferably in hot condition, is poured into the box, after which said opening is closed by the plug, whereby the portion of the cable, the wires, and the splicings within the box are incased or submerged in insulating material and made air-tight, rendering the same durable, serviceable, and reliable.

Should it be desired at any time to remove the insulating-liquid, this can be accomplished by unscrewing the plug opposite to the inlet or supply opening, whereby said material may be readily discharged from the box.

The shape of the box may be either cylindrical, oval, angular, or otherwise, as desired.

Having thus described my invention, what I claim as new, and desire to secure by Letters Patent, is—

1. A distributing-box for electric wires, consisting of a metallic box with screw-cap and provided with side openings of uniform diameter, nipples for said openings, plugs on opposite sides of said box, and ears at the back thereof, said parts being combined substantially as described.

2. A distributing-box for electric wires, consisting of a metallic box with screw-cap and provided with side openings and nipples therefor, and having plugs on opposite sides, substantially as and for the purpose set forth.

DAVID BROOKS, JR.

Witnesses:
JOHN A. WIEDERSHEIM,
A. P. JENNINGS.